United States Patent
Lee et al.

(10) Patent No.: US 12,289,077 B2
(45) Date of Patent: Apr. 29, 2025

(54) ECO-FRIENDLY FLOATING PHOTOVOLTAIC POWER GENERATION SYSTEM HAVING FUNCTIONS OF SELF-GENERATING OXYGEN IN WATER AND PREVENTING FRAME CORROSION

(71) Applicant: SCOTRA CORPORATION, Gunsan-si (KR)

(72) Inventors: Jong-Mok Lee, Pyeongtaek-si (KR); Chang-Sub Won, Seoul (KR); Dong-Chan Kim, Ansan-si (KR); Myeng-Gil Gang, Seongnam-si (KR); Sang-Gu Kim, Gyeonggi-do (KR)

(73) Assignee: SCOTRA CORPORATION, Gunsan-si (KR)

( * ) Notice: Subject to any disclaimer, the term of this patent is extended or adjusted under 35 U.S.C. 154(b) by 175 days.

(21) Appl. No.: 17/924,538

(22) PCT Filed: Jun. 18, 2020

(86) PCT No.: PCT/KR2020/007884
§ 371 (c)(1),
(2) Date: Feb. 3, 2023

(87) PCT Pub. No.: WO2021/230416
PCT Pub. Date: Nov. 18, 2021

(65) Prior Publication Data
US 2023/0179139 A1 Jun. 8, 2023

(30) Foreign Application Priority Data
May 12, 2020 (KR) .......................... 10-2020-0056548

(51) Int. Cl.
| | |
|---|---|
| *H02S 20/30* | (2014.01) |
| *C25B 1/04* | (2021.01) |
| *C25B 1/55* | (2021.01) |
| *C25B 11/073* | (2021.01) |
| *H02S 10/40* | (2014.01) |
| *H02S 30/10* | (2014.01) |

(52) U.S. Cl.
CPC ................ *H02S 10/40* (2014.12); *C25B 1/04* (2013.01); *C25B 1/55* (2021.01); *C25B 11/073* (2021.01); *H02S 20/30* (2014.12); *H02S 30/10* (2014.12)

(58) Field of Classification Search
CPC .......... H02S 10/40; H02S 20/30; H02S 30/10; C25B 1/04; C25B 1/55; C25B 11/073; Y02E 60/36; C02F 2201/46165
See application file for complete search history.

(56) References Cited

U.S. PATENT DOCUMENTS

2019/0233950 A1  8/2019  Mikami et al.

FOREIGN PATENT DOCUMENTS

| CN | 112260631 A | * | 1/2021 | ............. H02S 20/30 |
| EP | 3321395 A1 | * | 5/2018 | |

(Continued)

OTHER PUBLICATIONS

Machine translation of KR-101175896-B1, Shin G. (Year: 2012).*

(Continued)

*Primary Examiner* — Mayla Gonzalez Ramos
(74) *Attorney, Agent, or Firm* — Paratus Law Group, PLLC (57) ABSTRACT

There is provided a water solar power generation system including: a solar cell plate; a frame supporting the solar cell frame; and a float installed in the frame and positioning the solar cell plate on the surface of the water while floating on the surface of the water. The frame becomes a negative electrode and an optical electrode which becomes a positive electrode, and is electrically connected to the frame, and causes water decomposition while contacting water in the water to generate oxygen in the water.

9 Claims, 5 Drawing Sheets

(56) References Cited

FOREIGN PATENT DOCUMENTS

| | | | |
|---|---|---|---|
| JP | 2003-238104 A | 8/2003 | |
| JP | 2020-006765 A | 1/2020 | |
| KR | 101175896 B1 * | 8/2012 | |
| KR | 10-2015-0138768 A | 12/2015 | |
| KR | 20150139197 A * | 12/2015 | |
| KR | 10-2018-0022606 A | 3/2018 | |
| KR | 10-2020-0001385 A | 1/2020 | |
| KR | 10-2020-0005826 A | 1/2020 | |
| KR | 10-2020-0046854 A | 5/2020 | |
| WO | WO-2018038533 A1 * | 3/2018 | ......... H01L 31/0224 |

OTHER PUBLICATIONS

Machine translation of KR-20150139197-A, Park K. (Year: 2015).*
Machine translation of WO-2018038533-A1, Kim J H. (Year: 2018).*
Machine translation of EP-3321395-A1, Lopez C S. (Year: 2018).*
Machine translation of CN-112260631-A, Fu S. (Year: 2021).*
International Search Report for PCT/KR2020/007884 mailed Feb. 8, 2021 from Korean Intellectual Property Office.
Korean Office Action for related KR Application No. 10-2020-0056548 mailed Dec. 3, 2021 from Korean Intellectual Property Office.
Korean Notice of Allowance for related KR Application No. 10-2020-0056548 mailed Feb. 17, 2022 from Korean Intellectual Property Office.

* cited by examiner

ECO-FRIENDLY FLOATING PHOTOVOLTAIC POWER GENERATION SYSTEM HAVING FUNCTIONS OF SELF-GENERATING OXYGEN IN WATER AND PREVENTING FRAME CORROSION

CROSS-REFERENCE TO PRIOR APPLICATIONS

This application is a National Stage patent application of PCT International Patent Application No. PCT/KR2020/007884 (filed on Jun. 18, 2020) under 35 U.S.C. § 371, which claims priority to Korean Patent Application No. 10-2020-0056548 (filed on May 12, 2020), which are all hereby incorporated by reference in their entirety.

BACKGROUND

The present disclosure relates to a water solar power generation system, and an eco-friendly water solar power generation system which self-generates oxygen in the water and at the same time, prevents corrosion of a frame in the water to protect an aquatic ecosystem.

Recently, regulations have been implemented to suppress the emission of carbon dioxide around the world, so the development of new power generation devices without carbon dioxide emissions is required. As such, there is no discharge of carbon dioxide, and as a power generation device using clean energy, power generation devices using solar power are typical, and in recent years, supply has been expanded as the development and installation costs of technology have been lowered.

However, the solar power generation system varies depending on the power generation area and sunshine, and in order to install in a large area, there are many constraints in purchasing land due to the use of enormous land, and there is a problem in that a lot of cost is required due to purchasing or compensation of land, so there is a realistic difficulty to lead the cooperation of the residents around in order to establish a large-scale power generation facility.

In addition, in the solar power generation system installed on land as in the related art, a huge amount of heat is generated in the process of developing electricity and generating electricity, and a vast amount of energy is delivered from the land where the solar power system is installed, so the performance of a solar cell plate deteriorates and a failure of the solar cell plate is caused.

Accordingly, in order to secure a wide range of sunshine and open installation area while reducing the problem, water solar power generation facilities are actively proposed to install solar panels on water surface such as rivers, lakes, reservoirs, and dams, and are actually continuously constructed.

However, due to the nature of the area where the water solar power generation facility is installed, there is a problem that the corrosion of the frame is faster than that of the solar power generation facility installed on the land. A typical supplementary measure to cope with such a problem is to use POSMAC which is a steel frame material of which a surface is coated with a Zn-MG, or to use an Al-based alloy of which a plate is coated with an aluminum oxide film as a material. However, despite these supplementary measures, it was not enough to effectively prevent corrosion of the frame when exposed to falling water, moisture, salts, etc. for a long time.

In particular, considering that the lifespan of solar panels is 25 years, the corrosion problem of water solar power generation facilities and the problem of destruction of the aquatic ecosystems caused by it must be solved.

SUMMARY

The present disclosure provides an eco-friendly water solar power generation system which self-generates oxygen in the water by water decomposition and at the same time, prevents corrosion of a frame in the water to protect an aquatic ecosystem.

In an aspect, provided is an eco-friendly water solar power generation system which includes: a solar cell plate; a frame supporting the solar cell frame; and a float installed in the frame and positioning the solar cell plate on the surface of the water while floating on the surface of the water, in which the frame becomes a negative electrode and an optical electrode which becomes a positive electrode, and is positioned in the water while being electrically connected to the frame, and causes water decomposition while contacting water to generate oxygen in the water.

Here, by moving electrons generated at the time to the water decomposition by the optical electrode to the frame, corrosion of the frame may be prevented.

Further, the optical electrode may be made of a material having a standard hydrogen electrode potential larger than 1.23 eV.

Further, the optical electrode may be made of an n-type semiconductor material.

Further, the material of the optical electrode may be configured to include at least one material of $SrNbO_3$, $IrO_2$, $KtaO_3$, $BiVO_4$, $BaTiO_3$, $TiO_2$, $ZnO$, $BaTaO_2N$, $LaTaO_2N$, $CaTaO_2N$, $NaNbO_2N$, $SrNbO_2N$, $CdS$, $ZnS$, $MoS_2$, $AgIn_2S_{48}$, $In_2S_3$, $Fe_2O_3$, $SnO_2$, $Ta_3N_5$, $TaOH$, $C_3N_4$, $SiC$, and $Cu_2O$.

Further, the optical electrode may constitute an optical electrode module jointly with a pair of fixation frame members vertically coupled to the frame while being spaced apart from each other, a pair of rotation frame members rotatably connected to a lower end of the fixation frame member, an angle adjust member including a first member including a first fitting portion fitted and coupled to the fixation frame member and a first coupling portion formed at a lower side of the first fitting portion in a disk shape, and a second member including a second coupling portion which is fastened in contact with the first coupling portion of the first member by a center bolt and a nut, and fastened relatively rotatably with the center bolt as a central axis, and a second fitting portion which is formed at the lower side of the second coupling portion and fitted and coupled to the rotation frame member, and a substrate tray coupled while being supported on the rotation frame member and rotated with the rotation frame member while supporting the optical electrode on an upper surface to adjust a slope of the optical electrode.

Further, the fixation frame member may be constituted by an upper fixation frame member of which an upper end is coupled to the frame and a lower fixation frame member fitted and coupled to be slidable in a vertical direction through a lower end of the upper fixation frame member to adjust the height of the height of the optical electrode.

Further, multiple line type friction grooves may be placed on a contact surface where the friction grooves face each other at the first coupling portion and the second coupling portion of the angle adjustment member radially to extend toward an outer peripheral portion from the center to prevent the optical electrode from being unnecessarily dropped by an unexpected slip between the first coupling portion and the second coupling portion after the slope of the optical electrode is adjusted by relative rotation of the first coupling portion and the second coupling portion.

Further, when the friction groves formed on the surface of the first coupling portion and the contact surface of the second coupling portion in the angle adjustment member match while facing each other, a plurality of restraint wedges simultaneously fitted to both the friction grooves to restrict the first coupling portion and the second coupling portion not to be unnecessarily relatively rotated are further provided, and simultaneously fitted to a plurality of friction grooves adjacent nearby, and an integrated body sheet may be provided by connecting rear ends of the plurality of restraint wedges, and the body sheet may be made of a flexible elastic material and formed in a flat plate form at normal times, and deformed to an arc shape according to an angular change of the restraint wedge while fore-ends of the plurality of restraint wedges correspond to inlets of the plurality of friction grooves spaced apart from each other, and angles between the plurality of restraint wedges are changed while the plurality of restraint wedges are inserted into the friction grooves.

Further, an alarm which sets an alarm time by considering an expected lifespan of the optical electrode and generates an alarm when the set alarm time is reached may be further provided.

The eco-friendly water solar power generation system according to the present disclosure can protect a water ecosystem and maximize eco-friendly performance through dual functions of self-generating oxygen in the water by water decomposition and at the same time, preventing corrosion of a frame on the water.

Further, in the present disclosure, the eco-friendly water solar power generation system is provided in a form of a module which can adjust a height and a slope of an optical electrode, so initial installation and maintenance are convenient.

<Explanation of Reference Numbers>

| | |
|---|---|
| 100: Optical electrode module | 110: Fixation frame member |
| 120: Rotation frame member | 130: Angle adjustment member |
| 140: Substrate tray | 150: Optical electrode |

DETAILED DESCRIPTION

An eco-friendly water power generation system according to exemplary embodiments of the present disclosure will be described in detail with reference to the accompanying drawings. The present disclosure may have various modifications and various embodiments and specific embodiments will be illustrated in the drawings and described in detail in the specification. A method for manufacturing a low friction member according to an exemplary embodiment of the present disclosure will be described in detail with reference to the accompanying drawings. In describing each drawing, reference numerals refer to like elements. In the accompanying drawings, the sizes of structures are illustrated while being enlarged as compared with actual sizes for clarity of the present disclosure or downsized as compared with the actual sizes in order to appreciate a schematic configuration.

Further, terms including first, second, and the like are used for describing various constituent elements, but the constituent elements are not limited by the terms. The terms are used only to discriminate one element from another element. For example, a first component may be referred to as a second component, and similarly, the second component may be referred to as the first component without departing from the scope of the present disclosure. If it is not contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as an ideal meaning or excessively formal meanings unless clearly defined in the present application.

Exemplary Embodiments

Figure 1:
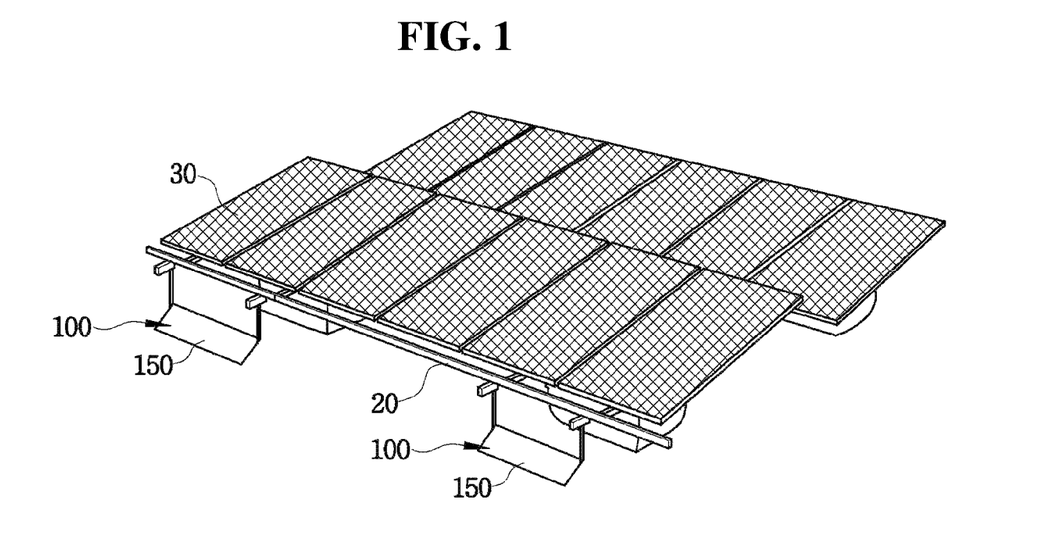
FIG. 1 is a perspective view of an eco-friendly water solar power generation system according to an exemplary embodiment of the present disclosure.
Figure 2:
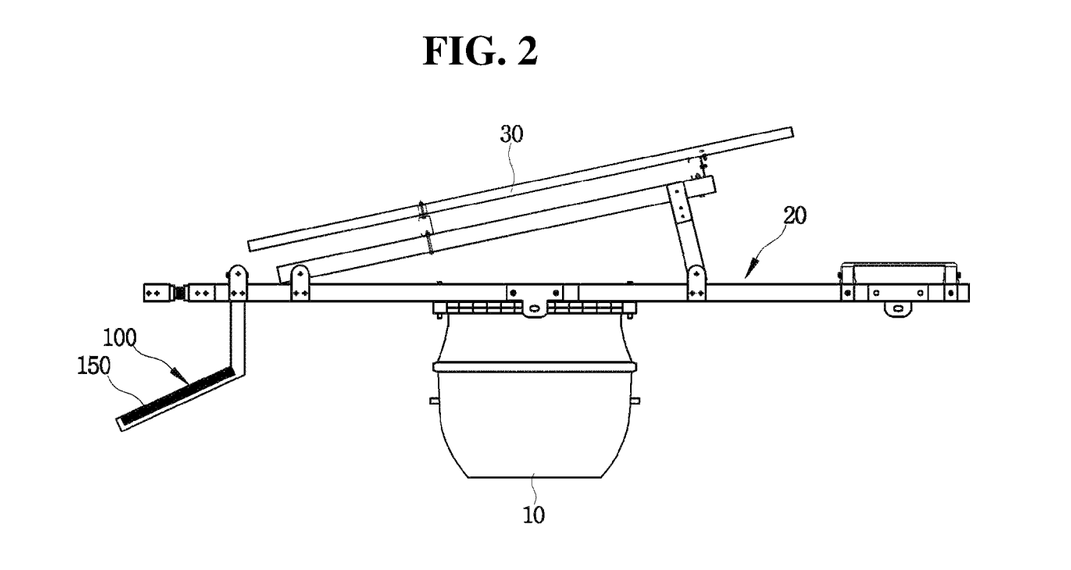
FIG. 2 is a partial side view of the eco-friendly water solar power generation system according to an exemplary embodiment of the present disclosure.
Figure 3:
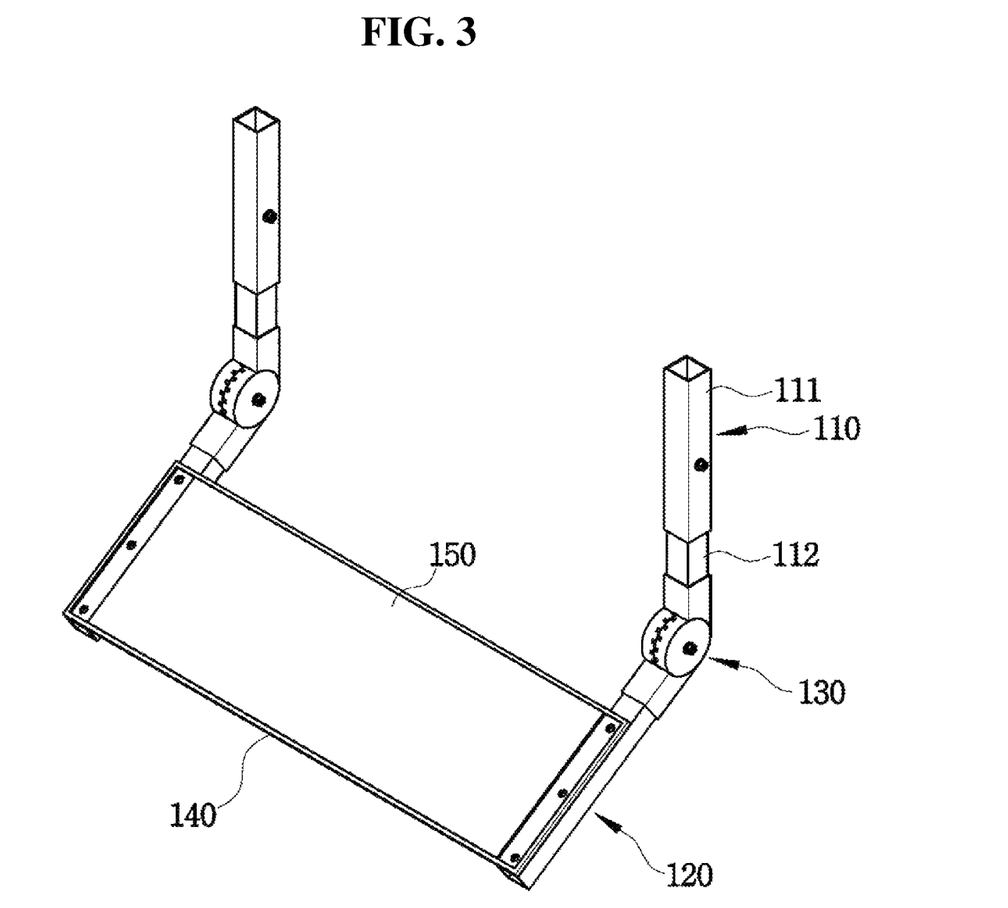
FIG. 3 is a perspective view of an optical electrode module of the eco-friendly water solar power generation system according to an exemplary embodiment of the present disclosure.
Figure 4:
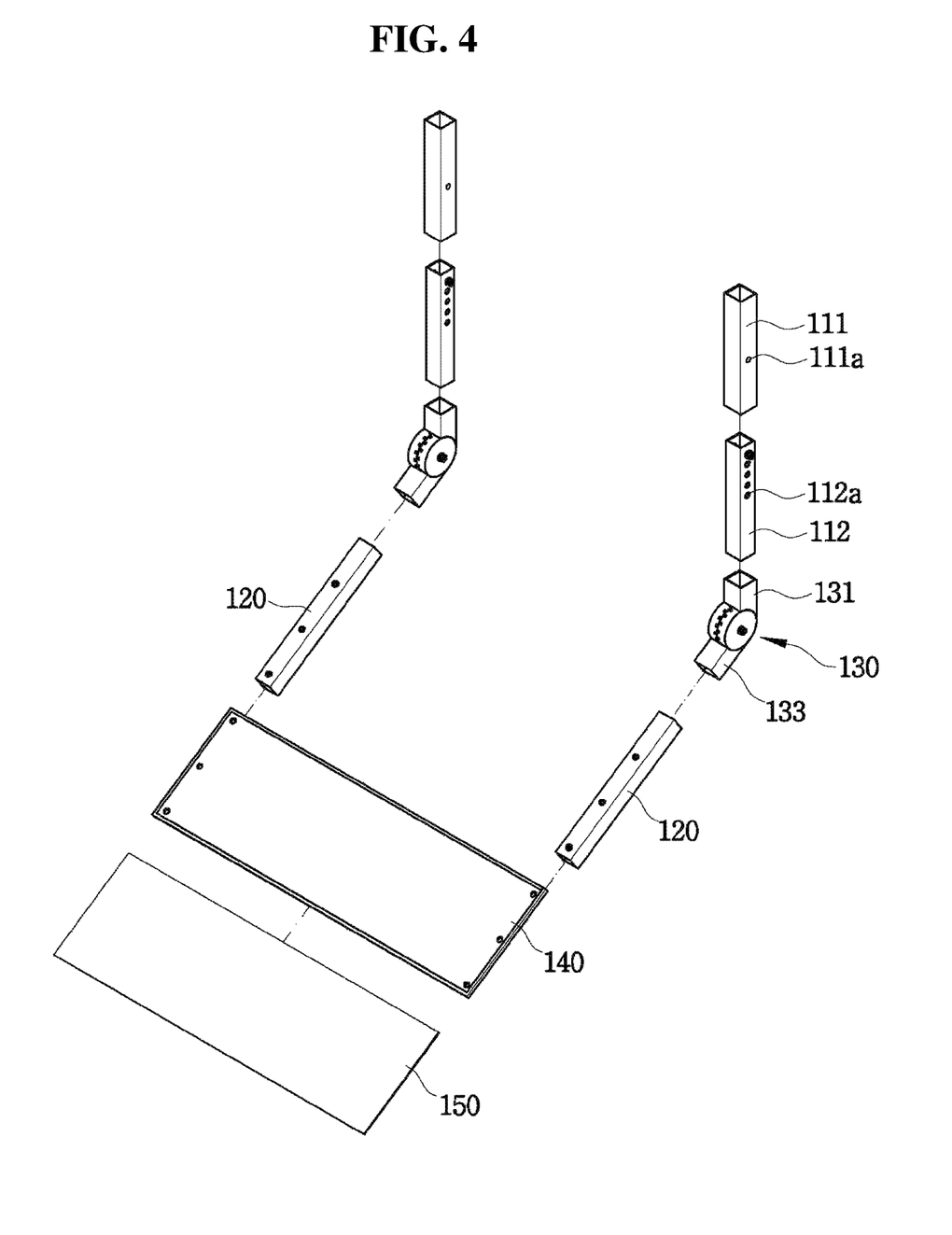
FIG. 4 is an exploded perspective view of an optical electrode module of the eco-friendly water solar power generation system according to an exemplary embodiment of the present disclosure.
Figure 5:
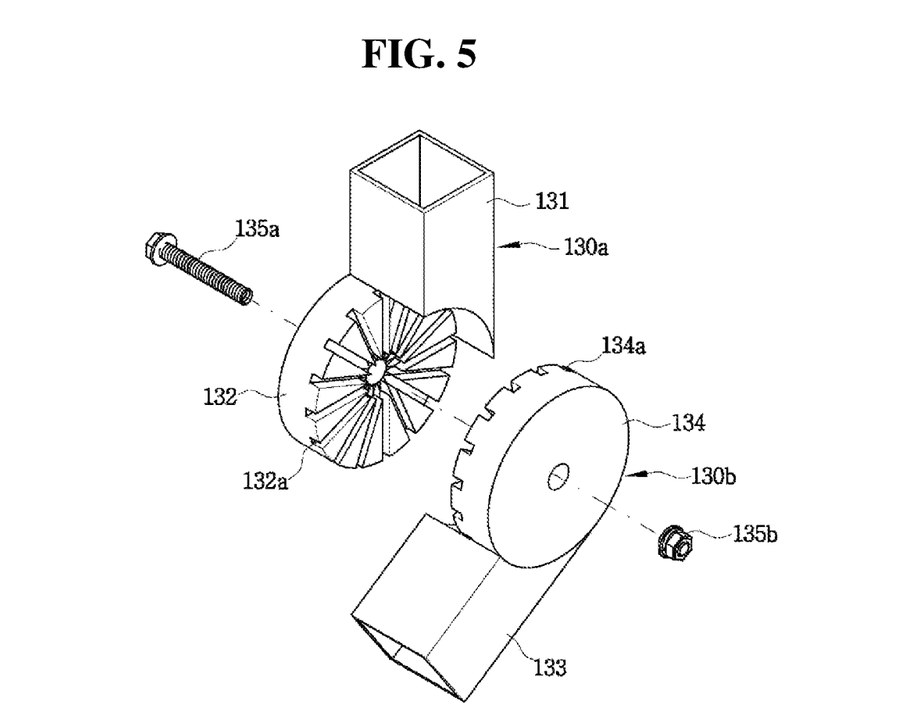
FIG. 5 is an exploded perspective view of an angle adjustment member of the eco-friendly water solar power generation system according to an exemplary embodiment of the present disclosure.
Figure 6:
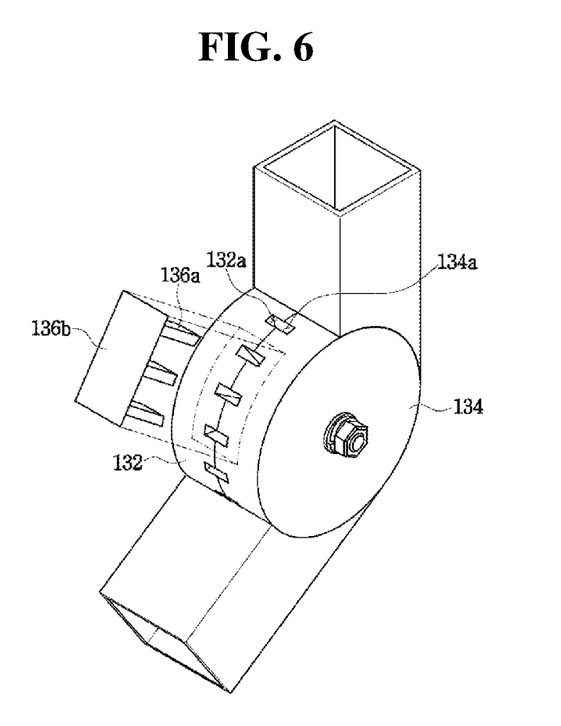
FIG. 6 is perspective view of an angle adjustment member of the eco-friendly water solar power generation system according to an exemplary embodiment of the present disclosure.

FIG. 1 is a perspective view of an eco-friendly water solar power generation system according to an exemplary embodiment of the present disclosure, FIG. 2 is a partial side view of the eco-friendly water solar power generation system according to an exemplary embodiment of the present disclosure, FIG. 3 is a perspective view of an optical electrode module of the eco-friendly water solar power generation system according to an exemplary embodiment of the present disclosure, FIG. 4 is an exploded perspective view of an optical electrode module of the eco-friendly water solar power generation system according to an exemplary embodiment of the present disclosure, and FIG. 5 is an exploded perspective view of an angle adjustment member of the eco-friendly water solar power generation system according to an exemplary embodiment of the present disclosure. FIG. 6 is a perspective view of an angle adjustment member of the eco-friendly water solar power generation system according to an exemplary embodiment of the present disclosure.

As illustrated, the eco-friendly water solar power generation system according to an exemplary embodiment of the present disclosure includes a solar cell plate 30, a frame 20 supporting the solar cell plate, and a float 10 coupled to the frame 20 and positioning the solar cell plate 30 on the surface of the water while floating on the surface of the water.

In the case of the present disclosure, the eco-friendly water solar power generation system additionally includes an optical electrode module 100 coupled to the frame 20, and an optical electrode 150 included in the optical electrode module 100 self-generates oxygen by causing water decomposition while contacting water in the water and at the same time prevents corrosion of the frame 20 by moving electrons generated at the time to the electrically connected frame 20. As such, according to the present disclosure, by a creative configuration acquired by newly introducing a water decomposition effect by the optical electrode into the water solar power generation system, a water ecosystem can be protected and eco-friendly performance can be maximized.

Hereinafter, the eco-friendly water solar power generation system according to an exemplary embodiment of the present disclosure will be described in more detail based on the optical electrode module 100.

In the eco-friendly water solar power generation system according to an exemplary embodiment of the present disclosure, the optical electrode which belongs to the optical electrode module 100 becomes a positive electrode in the water and the frame 20 becomes a negative electrode on the water to constitute one circuit, and the resulting reaction may be organized by the following reaction equation.

$2H_2O \rightarrow 4e^- + O_2 \uparrow + 4H^+$ (positive electrode, optical electrode, holes move from the negative electrode to the positive electrode)

$4e^- + 4H^+ \rightarrow 2H_2 \uparrow$ (negative electrode, frame, electrons move from the positive electrode to the negative electrode)

As seen in the above reaction equation, the electrons, oxygen, and hydrogen are generated in the water through water decomposition by the optical electrode 150, and the electrons generated at that time move to the frame 20 positioned on the water along electric wires. As a result, while the oxygen which assists the water ecosystem is acquired in the water and at the same time, the frame 20 receives the electrons on the water, the eco-friendly water power generation system is protected so that error due to oxidization rarely occurs.

For a smooth actual reaction like the above reaction equation, the optical electrode 150 should have a larger ionization tendency and a strong tendency in which oxidization is early generated than the frame 20, and to this end, the optical electrode 150 should be made of a material having a standard hydrogen electrode potential of at least 1.23 eV.

As a result, it is preferable that the optical electrode 150 should be made of an n-type semiconductor material which is a material having a standard hydrogen electrode potential larger than 1.23 eV. To this end, the material of the optical electrode 150 may be configured to include at least one material of $SrNbO_3$, $IrO_2$, $KtaO_3$, $BiVO_4$, $BaTiO_3$, $TiO_2$, $ZnO$, $BaTaO_2N$, $LaTaO_2N$, $CaTaO_2N$, $NaNbO_2N$, $SrNbO_2N$, $CdS$, $ZnS$, $MoS_2$, $AgIn_2S_{48}$, $In_2S_3$, $Fe_2O_3$, $SnO_2$, $Ta_3N_5$, $TaOH$, $C_3N_4$, $SiC$, and $Cu_2O$. All materials having the standard hydrogen electrode potential larger than 1.23 eV among the n-type semiconductor materials may be available.

Meanwhile, the frame 20 on the water, which is electrically connected to the optical electrode 150 should be made of a material which easily reacts while forming a pair with the optical electrode 150, and as the frame 20, using a generally used steel frame is enough. In particular, it is identified that 'POSMAC' of POSCO which is actually applied in the field due to known excellent corrosion resistance actively reacts while forming a pair with the optical electrode 150. Further, an AL frame to which $Al_2O_3$ is applied has a wide band gap, so there are some difficulties in the reaction, but the AL frame may be a material which is sufficiently usable.

The entire optical electrode module 100 is configured to include a pair of fixation frame members 110, a pair of rotation frame members 120, an angle adjustment member 130, and a substrate tray 140, and the members facilitate installation of the optical electrode 150 and enable adjustment of the height and the slope.

The fixation frame member 110 is vertically coupled to the frame 200 while being spaced apart from each other. The fixation frame member 110 is constituted by an upper fixation frame member 111 of which an upper end is coupled to the frame 20 and a lower fixation frame member 112 fitted and coupled to be slidable in a vertical direction through a lower end of the upper fixation frame member 11 to adjust the height of the height of the optical electrode 150. Multiple through holes 112a are formed on both side surfaces of the lower fixation frame member 112 to be penetrated by a fixation bolt, and a through hole 111a which is enabled to be penetrated by the fixation bolt is formed even in the upper fixation frame member 111 in response thereto, so the lower fixation frame member 112 of which height is adjusted may be fastened and fixed to the upper fixation frame member 111.

The rotation frame member 120 is rotatably connected to the lower end of the lower fixation frame member 110 via the angle adjustment member 130. The rotation frame member 120 is provided to support the optical electrode 150 to be tiltable.

The angle adjustment member 130 is constituted by a first member 130a and a second member 130b rotatably coupled to each other as illustrated in FIG. 5. The first member 130a is constituted by a first fitting portion 131 fitted and coupled to the fixation frame member 110 and a first coupling portion 132 formed at a lower side of the first fitting portion 131 in a disk shape. The second member 130b is constituted by a second coupling portion 134 which is fastened in contact with the first coupling portion 132 of the first member by a center bolt 135a and a nut 135b, and fastened relatively rotatably with the center bolt 135a as a central axis, and a second fitting portion 133 which is formed at the lower side of the second coupling portion 134 and fitted and coupled to the rotation frame member 120. Here, multiple line type friction grooves 132a and 134a are placed on a contact surface where the friction grooves face each other at the first coupling portion 132 and the second coupling portion 134 radially around the center portion to prevent the optical electrode from being unnecessarily dropped by an unexpected slip between the first coupling portion 132 and the second coupling portion 134 while the slope of the optical electrode 150 is adjusted by relative rotation of the first coupling portion 132 and the second coupling portion 134.

Furthermore, as illustrated in FIG. 6, when the friction groves 132a and 134a formed on the surface of the first coupling portion 132 and the contact surface of the second coupling portion 134 match while facing each other, a plurality of restraint wedges 136a simultaneously fitted to both the friction grooves 132a and 134a are further provided. The restraint wedges 136a are integrally coupled to three body sheets 136b to be simultaneously fitted to the friction grooves 132a and 134a at three nearby points in addition to being fitted only to the friction grooves 132a and 134a at one point. Here, the body sheet 136 is an integrated sheet by connecting rear ends of the plurality of restraint wedges 136a, and is made of a flexible elastic material and is formed in a flat plate form as illustrated in FIG. 6 at normal times, and is deformed to an arc shape according to an angular change of the restraint wedge 136a while fore-ends of the plurality of restraint wedges 136a correspond to inlets of the plurality of friction grooves 132a and 134a spaced apart from each other, and angles between the plurality of restraint wedges 136a are changed while the plurality of restraint wedges 136a are gradually inserted into the friction grooves 132a and 134a. When the integrated restraint wedge 136a and body sheet 136b are provided, the restraint wedge 136a and the body sheet 136b are more stably restrained so as not to be unnecessarily rotated relatively to each other while the first coupling portion 132 and the second coupling portion 134 of the angle adjustment member 130 are set.

Meanwhile, it is preferable that an alarm which sets an alarm time by considering an expected lifespan of the optical electrode 150 and generates an alarm when the set alarm time is reached is further provided. The alarm may be provided which generates light or an alarm sound or generates both the light and the alarm sound. Dozens of units of alarms of the system are arranged to be very useful to maintain the optical electrode module 100 in an actual field of which scale is large at an appropriate time.

Preferred embodiments of the present disclosure are described as above, but various changes, modifications, and equivalents may be used in the present disclosure. It is clear that the exemplary embodiments may be appropriately modified and similarly applied in the present disclosure. Accordingly, the disclosed contents do not limit the scope of the present disclosure defined by a limit of the claims.

The invention claimed is:

1. A water solar power generation system comprising:
a solar cell plate;
a frame supporting the solar cell plate;
a float installed in the frame and positioning the solar cell plate on the surface of the water while floating on the surface of the water; and
an optical electrode,
wherein the frame becomes a negative electrode, the optical electrode becomes a positive electrode, is electrically connected to the frame, and causes water decomposition while contacting the water to generate oxygen in the water, and
wherein the optical electrode constitutes an optical electrode module jointly with a fixation frame member vertically coupled to the frame, a rotation frame member rotatably connected to a lower end of the fixation frame member, an angle adjustment member including a first member including a first fitting portion fitted and coupled to the fixation frame member and a first coupling portion formed at a lower side of the first fitting portion in a disk shape, and a second member including a second coupling portion which is fastened in contact with the first coupling portion of the first member by a center bolt and a nut, and fastened relatively rotatably with the center bolt as a central axis, and a second fitting portion which is formed at a lower side of the second coupling portion and fitted and coupled to the rotation frame member, and a substrate tray coupled while being supported on the rotation frame member and rotated with the rotation frame member while supporting the optical electrode on an upper surface to adjust a slope of the optical electrode.

2. The water solar power generation system of claim 1, wherein by moving electrons generated at the time to the water decomposition by the optical electrode, corrosion of the frame is prevented.

3. The water solar power generation system of claim 1, wherein the optical electrode is made of a material having a standard hydrogen electrode potential larger than 1.23 eV.

4. The water solar power generation system of claim 1, wherein the optical electrode is made of an n-type semiconductor material.

5. The water solar power generation system of claim 1, wherein the optical electrode is configured to include at least one material selected from the group consisting of $SrNbO_3$, $IrO_2$, $KtaO_3$, $BiVO_4$, $BaTiO_3$, $TiO_2$, $ZnO$, $BaTaO_2N$, $LaTaO_2N$, $CaTaO_2N$, $NaNbO_2N$, $SrNbO_2N$, $CdS$, $ZnS$, $MoS_2$, $AgIn_2S_{48}$, $In_2S_3$, $Fe_2O_3$, $SnO_2$, $Ta_3N_5$, $TaOH$, $C_3N_4$, $SiC$, and $Cu_2O$.

6. The water solar power generation system of claim 1, wherein the fixation frame member includes:
an upper fixation frame member having an upper end coupled to the frame; and
a lower fixation frame member fitted and coupled to be slidable in a vertical direction through a lower end of the upper fixation frame member to adjust a height of the optical electrode.

7. The water solar power generation system of claim 1, wherein multiple line type friction grooves are placed on a contact surface where the friction grooves face each other at the first coupling portion and the second coupling portion of the angle adjustment member radially to extend toward an outer peripheral portion from the center to prevent the optical electrode from being unnecessarily dropped by an unexpected slip between the first coupling portion and the second coupling portion after the slope of the optical electrode is adjusted by relative rotation of the first coupling portion and the second coupling portion.

8. The water solar power generation system of claim 7, wherein when the friction groves formed on the surface of the first coupling portion and the contact surface of the second coupling portion in the angle adjustment member match while facing each other, a plurality of restraint wedges simultaneously fitted to both the friction grooves to restrict the first coupling portion and the second coupling portion not to be relatively rotated are further provided, and simultaneously fitted to a plurality of friction grooves adjacent nearby, and
an integrated body sheet is provided by connecting rear ends of the plurality of restraint wedges, and the body sheet is made of a flexible elastic material and is formed in a flat plate form, and is deformed to an arc shape according to an angular change of the restraint wedge while fore-ends of the plurality of restraint wedges correspond to inlets of the plurality of friction grooves spaced apart from each other, and angles between the plurality of restraint wedges are changed while the plurality of restraint wedges are inserted into the friction grooves.

9. The water solar power generation system of claim 1, wherein an alarm which sets an alarm time based on a predetermined lifespan of the optical electrode and generates an alarm when the set alarm time is reached is further provided.

* * * * *